United States Patent [19]

Wiese et al.

[11] 3,971,306

[45] July 27, 1976

[54] SYSTEM FOR MANUFACTURING ANIMAL FEED

[75] Inventors: Frank D. Wiese; Donald F. Link, both of Huntsville; Charles W. Brown, Guntersville, all of Ala.

[73] Assignee: Cord Systems, Inc., Huntsville, Ala.

[22] Filed: July 30, 1974

[21] Appl. No.: 493,173

[52] U.S. Cl................................. 99/348; 99/353; 99/355; 99/443 R; 99/484; 426/471
[51] Int. Cl.²...................... A23K 1/10; A23K 1/14
[58] Field of Search............. 99/494, 534, 645, 646, 99/330, 348, 353, 355, 443 R, 484; 159/4 SR, 4 UM, 25 R; 426/455, 456, 457, 464, 471, 473, 465, 520

[56] References Cited
UNITED STATES PATENTS

| | | | |
|---|---|---|---|
| 2,343,149 | 2/1944 | Krause, Jr. | 426/457 |
| 2,650,807 | 9/1953 | Bilek | 99/348 X |
| 2,904,435 | 9/1959 | Kruse | 426/457 X |
| 3,202,084 | 8/1965 | Hale et al. | 99/494 X |
| 3,549,384 | 12/1970 | Walker et al. | 426/520 X |
| 3,586,515 | 6/1971 | Anderson | 99/494 X |
| 3,787,583 | 1/1974 | Hruby | 426/464 X |

*Primary Examiner*—Billy J. Wilhite
*Assistant Examiner*—James A. Niegonski
*Attorney, Agent, or Firm*—C. A. Phillips

[57] ABSTRACT

The manufacture of animal feed using as a principal ingredient food waste, wherein the food waste is first ground to a fine particle size, cooked and dried, and then blended with certain additives to provide a complete animal feed.

3 Claims, 2 Drawing Figures

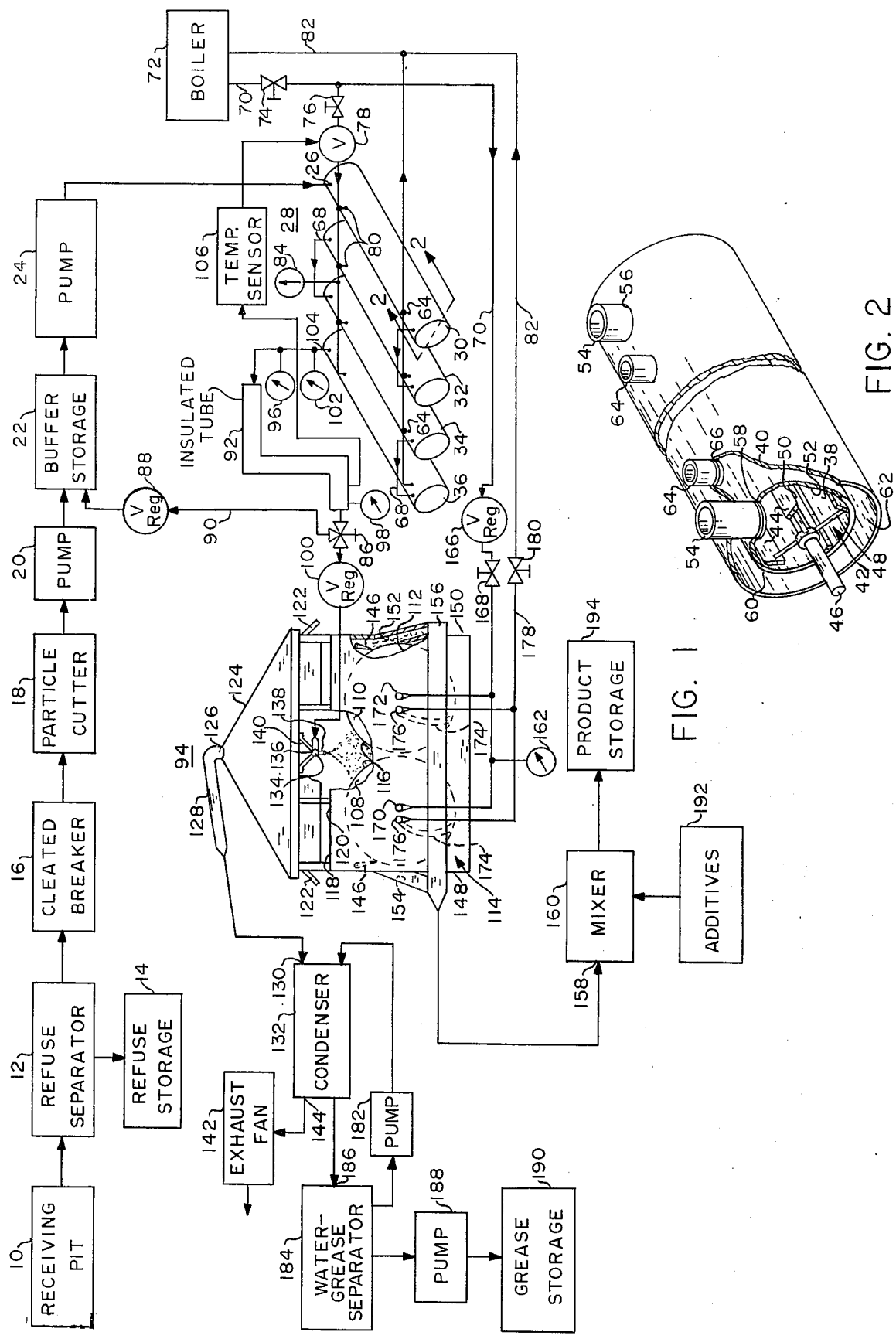

SYSTEM FOR MANUFACTURING ANIMAL FEED

BACKGROUND OF THE INVENTION

1. Field of the Invention

This invention relates to the conversion of food waste into animal feed, and more particularly to an improved means for the manufacture of animal feed employing as a principal constituent food waste.

2. General Description of the Prior Art

A most difficult problem facing urban areas today is how to dispose of food waste, and this term as used herein refers to animal and vegetable matter—that is, both material which was once a living organism and an animal in the broad sense, and material which is a vegetable, that is, organic material but not from a living organism. In past years, it was common practice and quite profitable to feed untreated "leftovers" to hogs and thus recycle the food waste. There were two distinct advantages realized from this practice. One, it produced meat for the table; and two, it largely eliminated the food disposal problem. Today, however, it is a well-established fact that such feeding of untreated food waste to animals is unsafe and only serves to spread diseases of both people and animals. Thus, many states have passed laws prohibiting this practice. The remaining problem of how to dispose of food waste without polluting wells, streams, or the atmosphere has grown to major proportions. Many solutions have been proposed, but perhaps the best answer is some satisfactory method of purifying and reclaiming this vital source of food energy. This "recycling" is in line with today's thinking about conserving our natural resources and at the same time improving the ecology.

Heretofore, many processes have been suggested for purifying, drying, and storing treated food waste from homes and institutions. Some processes involve the use of chemicals and rather complex operations, such as heating in a vacuum, which requires rather delicate control and measuring devices and consumes much time while processing limited quantities. In some instances, juices have been drained from the waste product before cooking, thus reducing the food value of the final product. In no known cases have others successfully determined a workable and economical system of manufacturing animal feed from table refuse or food garbage. The only known system that conceivably might do the job is a system for rendering meat, and presently such a system costs approximately $4½ million. With such a cost, it cannot be economically employed for purposes of handling food waste in general and converting it to animal feed.

Accordingly, it is an object of the present invention to provide a practical and economical system for the conversion of food waste in general to animal feed. After several years of inventive effort, the applicants have determined such a system, and construction of systems are presently scheduled for two locations in the United States.

It is a further object of this invention to provide a system of the category described which enables the process of conversion of food waste to animal feed to be on a continuous basis, wherein the conversion process is rapidly performed with assurance that all bacteria is killed and still without overheating material.

SUMMARY OF FEATURES OF THE INVENTION

In accordance with the present invention, a manufacturing system is constructed in which, first, damp food waste is pulverized to an emulsion having a particle size no greater than 0.02 inches. Pumping means at a pressure of 40 to 90 PSI pumps the food emulsion through a tubular heating assembly wherein it is brought up to a temperature of 240° to 300°F. at the point of exit from the heating assembly. From the heating assembly the heated emulsion passes through a holding chamber which is insulated, wherein the temperature of the emulsion is held at a temperature of 290° to 300° for the transit time through the chamber, which is between 10 and 30 seconds. This combination of particle size and temperature enables a very rapid, but certain sterilization during the transit time. In this fashion, a rapid continuous flow of sterilized material is achieved with the food waste remaining in a liquid state while transiting both the heating assembly and the sterilization chamber without adhering to the surfaces of these units.

The outlet of the holding chamber is connected through a pressure reduction valve to the interior chamber of a dryer, wherein the pressure is reduced essentially to atmospheric pressure. As a result, the water and grease in the material both flash into a vapor, thus separating and allowing to drop out the solid matter of the emulsion for final drying. Housed within the chamber of the dryer are counter-rotating drums positioned side-by-side with a spacing along a line of near engagement of 0.002 to 0.030 inches. Solid emulsion products are directed between the two drums which have like-peripheral directional motion along a line of near engagement, and thus the material is compressed onto each of the drums. The drums are heated by an internal heating arrangement to a temperature of 347° to 355°, thus rapid drying of the adhered material on the drums is achieved. After a turn of the drum, the material is scraped off and discharged from the dryer. The thus dried material is then mixed with selected additives to produce animal feed.

The water and grease vapor from the dryer are drawn off and fed to a condenser and water-separator, whereby the grease is salvaged and the water is discharged.

BRIEF DESCRIPTION OF THE DRAWINGS

FIG. 1 is a schematic illustration of an embodiment of the invention.

FIG. 2 is a partial pictoral view of the cooking assembly employed by the invention.

DETAILED DESCRIPTION OF THE DRAWINGS

Food waste, having an overall moisture content of 50 to 85 percent, is brought from selected collection points and discharged into receiving pit 10, which is typically a drive-over type of storage container.

The food waste is then augered, at a selectable rate, from the lower region of receiving pit 10 onto refuse separator-conveyor 12, where metallic and other undesirable elements are removed by conventional separation methods (not shown) and stored in refuse storage container 14. The food waste is then transferred into cleated breaker 16, which breaks large chunks contained in the collected waste into relatively small lengths. From breaker 16 the solids are augered into particle cutter 18, which further reduces the food waste to an emulsion which contains particles no larger than 0.020 inches.

This food waste, now in the form of an emulsion or puree, is pumped by pump 20 into buffer storage tank 22, wherein it is temporarily stored. The food thus stored in buffer storage 22 is selectively transferred by high-pressure pump 24 at a pressure of 40 to 90 PSI into inlet 26 of heating assembly 28. Heating assembly 28 consists of four similar cascaded tubular vessels 30, 32, 34, and 36, one of which is shown in greater detail in FIG. 2.

Each tubular vessel (FIG. 2) includes inner cylindrical chamber 38, which is closed at each end and is surrounded by a second closed cylinder 40 through which steam is supplied to provide heat. Each vessel is provided with an agitator assembly 42, having four longitudinally disposed blades 44, which are connected to central journalled shaft 46 by spoke-like members 48 and which extend the length of the vessel. Leading edge 50 of each blade 44 is rotated in contacting engagement with surface 52 of chamber 38, and the trailing edge is tilted inward toward agitator drive shaft 46. Being thus disposed, the blades provide a desirable movement to the contents of the vessel. Leading edge 50 of blades 44 scrapes hot inner surface 52 of chamber 38 and moves food toward the center. A new mass of food flows around the trailing edge of blades 44. This action helps prevent food from sticking while enabling uniform heat to be applied to the contents of a vessel as it is forced through a vessel under pressure from pump 24. Food is pumped into a vessel through one of tubular fittings 54, which communicates with a vessel chamber at a point near the ends of a vessel. Each fitting is sealably coupled through opening 56 in outer cylinder 40 and a second opening 58 formed in vessel wall 60. Steam is supplied to steam compartment 62 through tubular fittings 64, which are sealably attached through openings 66 in outer cylinder 40.

Chambers 38 (FIG. 2) of each vessel are connected in series by short lengths of tubing 68, which are coupled between fittings 54 of each vessel (FIG. 1). Steam from supply line 70 of boiler 72 is selectively fed through master valve 74, manual valve 76, and electrical valve 78 to inlets 80 of each of vessels 30, 32, 34, and 36. Steam and condensate are returned to return line 82 of boiler 72 through outlet couplings 64 located near the opposite ends of vessels 30, 32, 34, and 36. The inlet pressure of steam is observed by pressure gauge 84.

Food emulsion from outlet 54 of final vessel 36 passes through sterilization chamber 92 and is then selectively coupled through three-way valve 86 to input conduit 90 of buffer storage 22 or to dryer 94 through pressure regulator 100. Sterilization chamber 92 is an elongated tube through which the waste food emulsion flows at a maintained temperature to dryer 94. Temperature gauges 96 and 98 are used to verify this. Pressure regulator 100 holds a pressure on its inlet side of 40 to 90 PSI with a transition to atmospheric pressure on its outlet side. The pressure of food emulsion in the chamber of heating assembly 28 is visually observed by pressure gauge 102 coupled to pipe 104 between heating assembly 28 and sterilization chamber 92. Valve 86 may be closed or selectively opened to enable flow to either buffer storage 22 or dryer 94. The temperature of food emulsion at valve 86 is also sensed by temperature sensor 106 which provides an electrical signal to control valve 78, which controls the flow of steam through manually-operated valve 76 from steam line 70. The flow rate of steam is selectively adjusted by the signal from sensor 106 to maintain a temperature at this measured point.

During the initial start-up period, the wet food mass is recirculated by an output of three-way valve 86 through to one input of buffer storage 22. When the temperature of the material reaches 290°, three-way valve 86 is operated to feed the material through pressure regulator 100 to dryer 94. Regulator 100 controls the flow rate of material so that a pressure of 60 PSI is maintained back from valve 100 through sterilization chamber 92 and chambers 30, 32, 34, and 36 of heating assembly 28 to the output of positive displacement pump 24, which creates this pressure. This insures that the material will remain non-vaporous and damp to in turn prevent material from sticking to the surfaces of these units and thus insure the full flow of material through them.

Sterilization chamber 92 is of a size to accommodate a flow rate of 10,000 pounds per hour, whereby material transits the chamber in 10 to 15 seconds. The chamber is insulated to maintain the temperature of the material for this time, which at a temperature of 290° is sufficient to insure effective sterilization. From sterilization chamber 92 the material flows through regulator valve 100 to the interior of dryer 94. The rate of flow may be adjusted by valve 86 to insure that the temperature indicated by gauges 96 and 98 do not differ more than 5° and that the temperature indicated by gauge 98 is at least 290°. This insures that there occurs an adequate dwell of material in sterilization chamber 92 for the required time.

Dryer 94 employs a closely spaced pair of counter-rotating drums 108 and 110, which are closed at the ends and which are internally heated by steam to a temperature of 347° to 355°. Drums 108 and 110 are supported for rotation within the lower region 112 of an essentially symmetrically-shaped housing 114, and the ends of drums 108 and 110 rotate in sealable contact with the inner surfaces of forward and aft walls (not shown) of housing 114. The left drum is driven in a clockwise direction and the other drum 110 in a counterclockwise direction so that the adjoining surfaces 116, spaced 0.002 to 0.030 inches, are moving in a downward direction. The interior of housing 114 of dryer 94 is vented to atmosphere through a plurality of rectangular vents 118 in upper region 120 of the enclosure. Each is provided with a pivoted cover 122. These covers are selectively adjusted to provide a desired flow rate of ambient air.

Housing 114 is covered by domed canopy 124 which has outlet vent 126 formed at the apex, which is connected by downwardly inclined duct 128 to vapor intake 130 of condenser 132. The wet sterilized emulsion from regulator valve 100, now at atmospheric pressure, is fed into one end 134 of distribution pipe 136 and is sprayed onto heated drums 108 and 110 by a plurality of spaced outlet nozzles 138, which are joined to and supported by distribution pipe 136. Distribution pipe 136 extends the length of drums 108 and 110 and is supported at each end by bracket 140, in turn centrally secured to the fore and aft walls of housing 114. Grease and undesired moisture, which is vaporized upon contact with drums 108 and 110 along with a selected amount of ambient air, is drawn upward into canopy 124 by exhaust fan 142, coupled to exhaust outlet 144 of condenser 132. In the drying process, a thin layer of food waste adheres to closely spaced adjoining surfaces 116 of drums 108 and 110 and is thereby dried and removed in the form of flakes by elongated scraper blades 146, which are supported by the left and right closing walls 148 and 150, respectively, of housing 114. These flakes are gravity fed through elongated chutes 152 and 154 into horizontal conveyors (not shown), which transfer the flaky material into an exit conveyor 156. Conveyor 156 then augers the dried food into food waste inlet 158 of mixer 160.

Steam from boiler 72 at a pressure of 120 to 145 PSI, as indicated by pressure gauge 162, is selectively distributed through manually-operated master valve 74, supply pipe 70, pressure-regulated valve 166, and manually-controlled valve 168 to steam supply inlets 170 and 172 of drums 108 and 110. Condensed moisture and steam is returned from drums 108 and 110 through return pipe 174, the inner end of which extends downward to a point near the lower inner surface of drums 108 and 110 and is connected through return outlet 176 through steam return pipe 178 and valve 180 to boiler 72.

Greasy vapors entering condenser 132 are condensed and removed by a fine mist of water at inlet 130, which is pumped by pump 182 from a water reservoir (not shown) contained in water-grease separator 184. Uncondensed steam is simply exhausted by exhaust fan 142, and the greasy condensate settles into a reservoir (not shown) located in condenser 132. This greasy condensate is drawn into inlet 186 of water-grease separator 184, wherein the grease is separated from the water and pumped by pump 188 into grease storage tank 190. The water is collected in a reservoir (not shown) and supplied to water pump 182.

Processed food waste is conveyed into mixer 160 by conveyor 156 at a selected rate, and the appropriate additives 192 are metered into mixer 160 in accordance with the specified percentages required for each additive. The total of all additives typically constitutes 10 percent by weight of the finished product. When mixed, the final product is conveyed into product storage bin 194, typically by a blower-type conveyor (not shown).

In summary, the system as herein described contains the solutions to problems that have heretofore prevented the definition and therefore the construction of an operable, practical, and economical system for conversion of waste food into animal feed. There have been various suggestions and portions of systems which it appeared might possibly be employed in the determination of a system which could actually be constructed and operated at a profit, but for one reason or another, none of these provided or suggested a complete solution to the problems. In overcoming the difficulties and omissions previously suggested, the applicants have determined a system which will operate on a conntinuous rapid flow basis; one that costs a small fraction of a meat rendering plant (believed to be the closest operable art device); a system which breaks the material down to a selected particle size and accomplishes complete sterilization without oversterilization and wasted heat; handles the material in discrete heating and sterilizing stages, enabling very precise control of the period when the material is held at an elevated temperature for sterilization; and a system which includes means for reclaiming, with very little additional apparatus, the grease obtained in the waste food.

What is claimed is:

1. A system for the manufacture of animal feed comprising:

pulverizing means, including means for receiving animal and vegetable material and liquid for providing as an output an emulsion wherein solid particle sizes are held to 0.02 inch in maximum dimension;

heating means having an inlet and outlet, and comprising means for receiving the output of said pulverizing means at said inlet and raising the temperature of said emulsion to 240° to 300°F. at a pressure of 40 to 90 PSI and discharging said emulsion at said outlet, and comprising:

at least one heated elongated tube, having an inlet and outlet, and stirring means within said tube for stirring said emulsion and preventing said emulsion from adhering to the inner surface of said tube, buffer storage means having first and second inlets and an outlet, said first inlet being coupled to the output of said pulverizing means, and said outlet being coupled to an inlet of said elongated tube, and valve means having an inlet connected to the output of said elongated tube and having first and second selected outputs, said first output being connected to said second inlet of said buffer storage means, whereby, selectively, said emulsion may be initially recirculated through said buffer storage means and said heating means until the emulsion is heated to a temperature of 240° to 300°F. and thereafter supplied to said second output;

sterilization means comprising:
an insulated chamber having an inlet coupled to said second output of said heating means,
an intermediate region, and
an outlet, whereby the heated emulsion is received at said inlet and passed through said insulated chamber to said outlet at a temperature of 240° to 300°F. during transit of said emulsion through said chamber;

pumping means for pumping said emulsion from said pulverizing means through said heating means and said sterilization means with a transit time of 10 to 30 seconds through said sterilization means; and drying means having an inlet coupled to said outlet of said sterilization means for receiving sterilized emulsion from said sterilization means and separating moisture and grease from said emulsion, whereby a solid material is provided as an output, and comprising:

an enclosure, including means for providing a reduced pressure within said enclosure compared to that in said heating means, a pair of rotating heated drums, said drums being positioned within said enclosure side-by-side, and wherein adjoining rotating surfaces of said drums have a like direction of peripheral movement, and wherein at the closest region between drums there is a spacing of 0.002 to 0.030 inch, means for spraying said emulsion from said sterilization means into a region of said enclosure above said drums, whereby liquid portions of the emulsion are substantially vaporized by virtue of reduced pressure and solid matter is directed onto and between the adjacent rotating drums, and whereby a film of material forms, dries, and initially adheres to the sides of said drum, and scraping means in engagement with each said drum for removing said solid matter and for providing it as said output of said drying means.

2. A system as set forth in claim 1 comprising:

vapor outlet means connected to said enclosure, and including means for providing as an outlet of said drying means a vapor comprising a mixture of water vapor and grease vapor;

condensing means responsive to said water and grease vapor from said drying means for condensing the water and grease vapors; and separation means comprising means to receive the output of said condensing means and to separate water and grease, whereby grease may be reclaimed.

3. A system as set forth in claim 2 further comprising steam generating means for providing heating steam to said heating means and the interior of said drums of said drying means.

* * * * *